US006496447B1

(12) United States Patent
Gabriel

(10) Patent No.: US 6,496,447 B1
(45) Date of Patent: Dec. 17, 2002

(54) TARGET SIMULATION SYSTEM

(75) Inventor: Gary M. Gabriel, Middletown, RI (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 09/416,112

(22) Filed: Oct. 4, 1999

(51) Int. Cl.[7] .................... H04K 3/00

(52) U.S. Cl. .................... 367/1

(58) Field of Search .................... 367/1, 13, 131; 434/6, 10; 73/167; 114/21.3; 89/1.13

(56) References Cited

U.S. PATENT DOCUMENTS 3,921,559 A * 11/1975 Wells Sr. .................... 367/1
5,144,587 A * 9/1992 Mason .................... 367/1

* cited by examiner

*Primary Examiner*—Daniel T. Pihulic
(74) *Attorney, Agent, or Firm*—Michael J. McGowan; James M. Kasischke; Prithvi C. Lall

(57) ABSTRACT

A target simulation system is used to simulate a target, such as a submarine, for testing of homing projectiles, such as anti-submarine warfare (ASW) torpedoes. The target simulation system includes a target portion having an impact structure and a plurality of acoustic reflectors spaced at a distance that simulates the spatial extent and acoustic highlights of the desired target. The target simulation portion is suspended at a predetermined depth within an underwater environment using one or more suspension assemblies. The suspension assemblies include one or more support floats that float on the surface of the water and suspension lines that extend from the respective support floats to the target portion. A reflector sail is coupled to a support float at one end of the target simulation system and captures the surface wind to apply a force to the target simulation portion. A drogue is coupled to the target simulation portion at an opposite end of the target simulation system and applies a drag force in an opposite direction to arrange the reflectors in a line.

15 Claims, 1 Drawing Sheet

TARGET SIMULATION SYSTEM

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention is related to target simulation systems and in particular, to a target simulation system for testing a homing projectile in an underwater environment.

(2) Description of the Prior Art

A typical self-propelled anti-submarine warfare (ASW) torpedo is equipped with electronic homing equipment for enabling the torpedo to seek out its target, such as a submarine. The ASW torpedo can be equipped with a sensitive passive acoustic receiver for detecting sound waves emitted by a target vessel. The received sound waves control the navigation and guidance equipment of the torpedo to direct the torpedo toward the target. The ASW torpedo can also be equipped with an active homing system wherein the torpedo itself generates and transmits an acoustic signal and is guided by the reflection of the acoustic signal off of the target.

The ability of ASW torpedoes to properly home in on and detonate on a target must be tested periodically using exercises known as "warshot" exercises. One type of target currently used for warshot exercises is known as the Mk28, which consists of an acoustic noise maker and a small panel section against which the torpedo detonates. This type of target, however, is an acoustic point source, and most modern ASW torpedoes have sophisticated homing circuitry that does not recognize the Mk28 as a valid target. To accurately test the capability of these modern torpedoes, the torpedoes need to measure the spatial extent of the target and determine the acoustic highlights indicative of the length and construction of the vessel being simulated by the target, such as a submarine. Thus, to test these modern torpedoes with the existing Mk28 target, artificial constraints are placed on the torpedoes being tested, thereby affecting the validity of the testing.

Other types of targets used for testing torpedoes or other homing projectiles are large heavy structures designed to simulate the size and shape of the target vessel. These large and unwieldy targets are difficult to transport and deploy for use during warshot exercises.

SUMMARY OF THE INVENTION

One object of the present invention is to effectively simulate a target, such as an underwater vessel, for testing the ability of a torpedo or other homing projectile to home in on and detonate on the target.

Another object of the present invention is a target simulation system that can test the homing and detonation requirements of torpedoes without requiring substantial modification of the torpedo, artificial constraints on the torpedo settings, or other restrictions on the warshot exercise.

A further object of the present invention is a target simulation system having low cost and light weight such that the system can easily be transported and deployed.

The present invention features a target simulation system for testing a homing projectile in an underwater environment. The target simulation system comprises a target simulation portion and one or more suspension assemblies extending from the target simulation portion to a surface of the underwater environment for suspending and supporting the target simulation portion at a predetermined depth within the underwater environment. The target simulation portion includes an impact structure for detonating the homing projectile, and a plurality of reflectors spaced at a distance from the impact structure for reflecting signals transmitted by the homing projectile in a manner that simulates the desired target.

The target simulation portion preferably includes at least first and second boom assemblies extending from the impact structure. The reflectors are disposed in a spaced relationship on one or more booms in the first and second boom assemblies. The first and second boom assemblies preferably include a plurality of booms coupled with flexible couplings.

In one example, the reflectors include passive acoustic reflectors that reflect acoustic signals transmitted by the homing projectile. The target simulation system preferably includes an acoustic noise source disposed on the impact structure for providing a noise simulating the desired target.

The one or more suspension assemblies preferably include first and second boom suspension assemblies, extending from respective ends of the first and second boom assemblies, for suspending the first and the second boom assemblies in the underwater environment. The boom suspension assemblies include a boom support float floating on a surface of the underwater environment, and a boom suspension line extending from the boom support float to a respective one of the boom assemblies.

The target simulation system further includes a reflector sail coupled to the first boom suspension assembly. The reflector sail extends above the surface of the underwater environment and captures surface wind to apply a force that maintains the boom assemblies and the reflectors substantially in line. A drogue is preferably coupled to an end of the second boom assembly for providing a drag force to the target simulation portion such that the reflector sail and drogue apply forces in substantially opposite directions. An additional reflector can be coupled to a float at an end opposite the reflector sail and extend above the surface to reflect radar.

The suspension assemblies further include one or more impact structure suspension assemblies. Each impact structure suspension assembly preferably includes an impact structure support float for floating on a surface of the underwater environment and an impact structure suspension line extending from the impact structure support float to the impact structure.

BRIEF DESCRIPTION OF THE DRAWINGS

These and other features and advantages of the present invention will be better understood in view of the following description of the invention taken together with the drawings wherein.

DESCRIPTION OF THE PREFERRED EMBODIMENT

Figure 1:
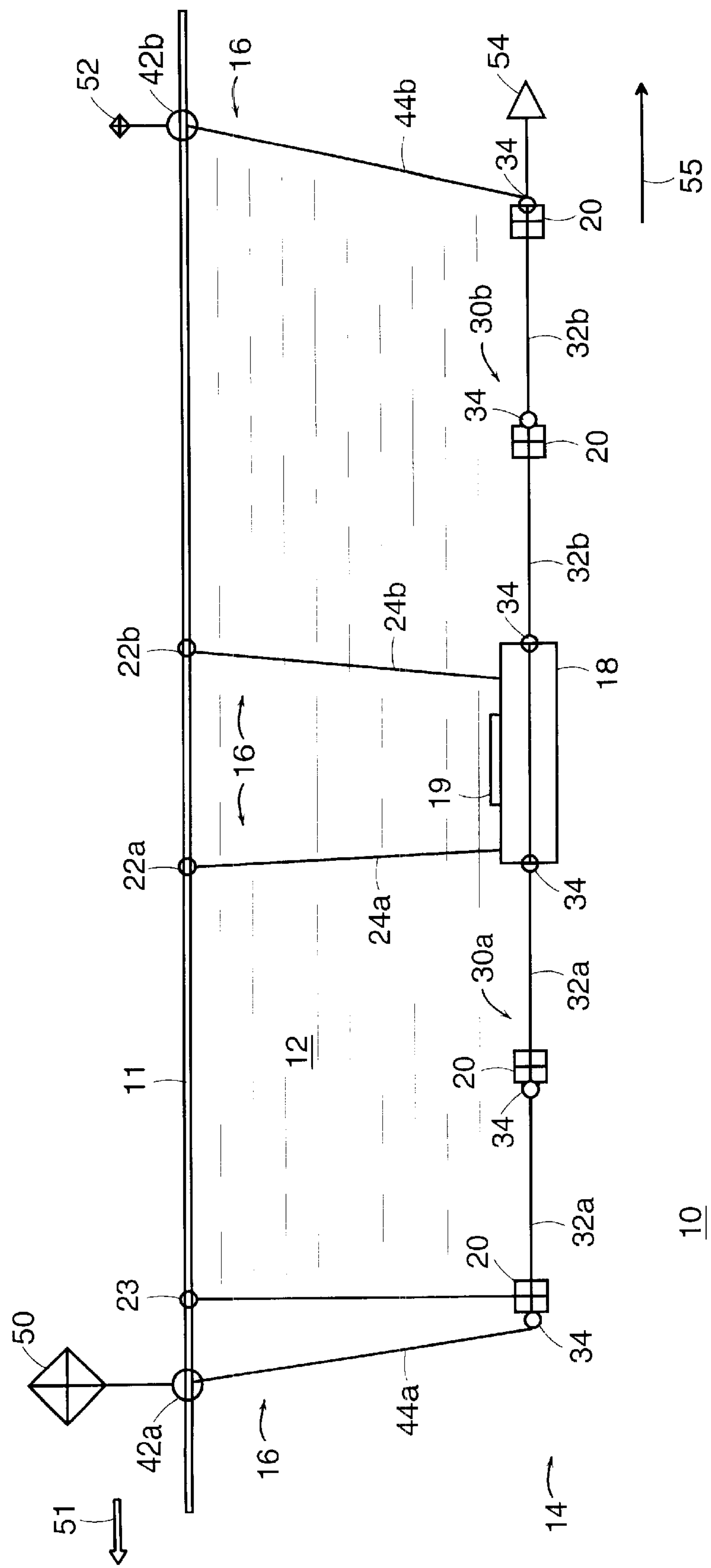
FIG. 1 is a side schematic view of the target simulation system according to the present invention.

As shown in the FIG. 1, a target simulation system 10 according to the present invention is used in an underwater environment 12 to test a homing projectile (not shown), such as an anti-submarine warfare (ASW) torpedo. The target simulation system 10 is designed to test the homing abilities and detonation of live homing projectiles. The target simulation system 10 is capable of simulating a full size submarine or any other vessel that might be a desired target.

The target simulation system 10 includes a target simulation portion 14 disposed at a predetermined depth beneath a surface 11 of the underwater environment 12. The target simulation system 10 further includes one or more suspension assemblies 16 that extend from the surface 11 of the water to the target simulation portion 14 to suspend and support the target simulation portion 14 at the predetermined depth within the underwater environment 12.

The target simulation portion 14 includes an impact structure 18 for detonating the homing projectile and one or more reflectors 20, such as passive acoustic reflectors, spaced at a distance from the impact structure 20 for reflecting signals transmitted by the homing projectile. The reflectors 20 are spaced such that the reflected signals simulate the spatial extent and acoustic highlights of an actual target. The impact structure 18 is preferably made of steel plate and is capable of detonating both impact and influence exploder mechanisms used in various types of projectiles. Examples of the impact structure 18 include a screen and a large diameter tube similar to a fuel oil tank. The form and construction of the impact structure must provide adequate mass to detonate the incoming torpedo but should be simply fabricated using common steel fabrication techniques.

The target simulation system 10 preferably includes an active transponder and/or noise source 19 disposed on the impact structure 18. The noise source 19 generates and transmits noise or acoustic signals that simulate the sound of a submarine or other vessel.

One or more of the suspension assemblies 16 extend from the impact structure 18 to suspend and support the impact structure 18 in the underwater environment 12. According to the preferred embodiment, impact structure floats 22*a*, 22*b* float on the surface 11 of the underwater environment 12, and suspension assembly suspension lines 24*a*, 24*b* extend from the impact structure floats 22*a*, 22*b* and are coupled to the impact structure 18, thereby supporting the impact structure 18 within the underwater environment 12. The floats 22*a*, 22*b* are preferably commercially available mooring floats. Intermediate support floats of similar construction such as the one shown at 23 can be provided for additional support. The suspension lines 24*a*, 24*b* are preferably lines or cables made of synthetic acoustically non-reflective rope or other suitable materials.

The target simulation portion 14 includes one or more boom assemblies 30*a*, 30*b* extending outwardly from the impact structure 18. The boom assemblies 30*a*, 30*b* include one or more booms 32*a*, 32*b* on which the reflectors 20 are disposed in a spaced relationship. Booms 32*a*, 32*b* are made of a rigid material such as steel pipe. The booms 32*a*, 32*b* are preferably coupled together and coupled to the impact structure 14 with flexible couplings 34 formed from steel rod. The flexible couplings 34 allow some movement or flexure of the boom assemblies 30*a*, 30*b* without damaging the target simulation portion 14. Although two boom assemblies 30*a*, 30*b* are shown extending outwardly from the impact structure 18, the present invention contemplates any number of boom assemblies extending from the impact structure 18 in any possible direction.

In the preferred embodiment, the reflectors 20 include passive acoustic reflectors disposed on the respective booms 32*a*, 32*b* at a distance that allows the homing projectile to measure the spatial extent of the target length and that allows proper reflection of the acoustic highlights of the simulated target. Thus, the spacing of the acoustic reflectors 20 on the respective booms 32*a*, 32*b* effectively simulates the desired target without having to place artificial constraints on the settings of the torpedo or homing projectile during testing. Alternatively, transponders can be used on the boom assemblies 30*a*, 30*b* to transmit acoustic or other types of signals in a manner that simulates the desired target.

One or more of the suspension assemblies 16 extend from respective ends of the first and second boom assemblies 30*a*, 30*b* for suspending and supporting the first and second boom assemblies 30*a*, 30*b* at the predetermined depth within the underwater environment 12. Boom support floats 42*a*, 42*b* float on the surface 11 of the underwater environment 12, and boom suspension lines 44*a*, 44*b* extend from respective boom support floats 42*a*, 42*b* and are coupled to the respective ends of first and second boom assemblies 30*a*, 30*b*. The boom support floats 42*a*, 42*b* are preferably larger than the impact structure support floats 22*a*, 22*b* to provide added support for the radar reflectors 50, 52 that mark the ends of the target simulation system 10 as disclosed hereinafter.

According to an alternative embodiment, the booms 32*a*, 32*b* can include hydraulically inflated structures. These structures would still be negatively buoyant and need floats 22*a*, 22*b* and cables for support and positioning.

The target simulation system 10 further includes a reflector sail 50 coupled to a boom support float 42*a* at one end of the target simulation system 10. The reflector sail 50 captures wind along the surface 11 and applies a force to the end of the target simulation system 10 generally in the direction of arrow 51. A drogue or sea anchor 54 is coupled to the boom assembly 30*b* at an opposite end of the target simulation system 10. The drogue 54 causes a drag force acting generally in the direction of arrow 55 and opposite the force caused by the wind acting on the reflector sail 50. The forces together maintain the boom assemblies 30*a*, 30*b* and reflectors 50 substantially in line.

The reflector sail 50 also acts to reflect radar in a manner that locates the position of the target simulation system 10.

An additional smaller reflector 52 can be coupled to the boom support float 42*b* at the opposite end of the target simulation system 10 to reflect radar and further simulate the desired target. The reflector sail 50 and smaller reflector 52 are preferably made of aluminum and/or metal coated plastics.

Accordingly, the target simulation system of the present invention simulates a desired target, such as a full size submarine, and allows testing of homing projectiles, such as ASW torpedoes, without having to modify the torpedoes or use artificial constraints on the torpedo settings. The target simulation system including the boom assemblies with reflectors is also light weight and can be easily transported and deployed for warshot exercises.

In light of the above, it is therefore understood that within the scope of the appended claims, the invention may be practiced otherwise than as specifically described.

What is claimed is:

1. A target simulation system for testing a homing projectile in an underwater environment, said target simulation system comprising:

a target simulation portion including:

an impact structure for detonating said homing projectile; and a plurality of reflectors spaced from said impact structure for reflecting signals transmitted by said homing projectile in a manner that simulates a desired target for said homing projectile; and at least one suspension assembly extending from said target simulation portion to a surface of said underwater environment and suspending and supporting said target simulation portion at a predetermined depth within said underwater environment.

2. The target simulation system of claim 1 wherein said plurality of reflectors include passive acoustic reflectors for reflecting acoustic signals transmitted by said homing projectile.

3. The target simulation system of claim 1 further including an acoustic noise source disposed on said impact structure for providing a noise simulating said desired target.

4. The target simulation system of claim 1 wherein said target simulation portion further comprises at least first and second boom assemblies extending from said impact structure, wherein each of said first and second boom assemblies include at least one boom, and wherein each of said plurality of reflectors are disposed in a spaced relationship on respective ones of said at least one boom.

5. The target simulation system of claim 4 wherein said first and second boom assemblies include a plurality of booms coupled with flexible couplings.

6. The target simulation system of claim 4 wherein said at least one suspension assembly includes at least first and second boom suspension assemblies joined to respective ends of said at least first and second boom assemblies for suspending said first and second boom assemblies in said underwater environment.

7. The target simulation system of claim 6 wherein each of said at least first and second boom suspension assemblies comprise:

a boom support float floating on the surface of said underwater environment; and a boom suspension line extending from said boom support float to a respective one of said first and second boom assemblies.

8. The target simulation system of claim 6 further including a reflector sail coupled to said first boom suspension assembly, wherein said reflector sail extends above said surface of said underwater environment for capturing a surface wind and applying a force to maintain said boom assemblies and said reflectors substantially in line.

9. The target simulation system of claim 8 further including a drogue coupled to an end of said second boom assembly for providing a drag force within said underwater environment, wherein said reflector sail and said drogue apply forces in substantially opposite directions to maintain said boom assemblies and said acoustic reflectors substantially in line.

10. The target simulation system of claim 8 further including a radar reflector coupled to said second boom suspension assembly, said reflector adapted to extend above said surface of said underwater environment.

11. The target simulation system of claim 10 wherein said reflector sail coupled to said first boom suspension assembly is larger than said reflector coupled to said second boom suspension assembly.

12. The target simulation system of claim 4 wherein said at least one boom in each of said first and second boom assemblies is a hydraulically inflated structure.

13. The target simulation system of claim 4 wherein said at least one boom in each of said first and second boom assemblies is a rigid structure.

14. The target simulation system of claim 1 wherein said at least one suspension assembly includes first and second impact structure suspension assemblies extending from said impact structure and supporting said impact structure at said predetermined depth within said underwater environment.

15. The target simulation system of claim 14 wherein each of said first and second impact structure suspension assemblies include:

an impact structure support float floating on a surface of said underwater environment; and an impact structure suspension line extending from said impact structure support float to said impact structure.

* * * * *